(12) United States Patent
Hofmann et al.

(10) Patent No.: US 7,407,045 B2
(45) Date of Patent: Aug. 5, 2008

(54) CONNECTION BETWEEN A WHEEL BEARING AND A WHEEL CARRIER

(75) Inventors: Heinrich Hofmann, Schweinfurt (DE); Jens Heim, Schweinfurt (DE); Peter Niebling, Bad Kissingen (DE); Horst Masuch, Schweinfurt (DE)

(73) Assignee: Fag Kugelfischer AG (DE)

( * ) Notice: Subject to any disclaimer, the term of this patent is extended or adjusted under 35 U.S.C. 154(b) by 0 days.

(21) Appl. No.: 10/603,289

(22) Filed: Jun. 24, 2003

(65) Prior Publication Data
US 2004/0032160 A1 Feb. 19, 2004

(30) Foreign Application Priority Data
Jun. 25, 2002 (DE) ............... 102 28 379

(51) Int. Cl.
*F16F 9/00* (2006.01)

(52) U.S. Cl. .................. 188/382; 301/35.621

(58) Field of Classification Search ........ 301/132, 301/35.621; 403/274, 277; 188/382
See application file for complete search history.

(56) References Cited

U.S. PATENT DOCUMENTS

| | | | | |
|---|---|---|---|---|
| 3,749,416 A | * | 7/1973 | Asberg | 280/105 |
| 4,466,503 A | * | 8/1984 | Hans et al. | 180/259 |
| 5,762,559 A | * | 6/1998 | Jacob et al. | 464/145 |
| 5,868,409 A | * | 2/1999 | Breuer | 280/93.512 |
| 5,927,820 A | * | 7/1999 | Vignotto et al. | 301/105.1 |
| 6,565,159 B1 | * | 5/2003 | Kosak | 301/132 |
| 6,832,855 B2 | * | 12/2004 | Hofmann et al. | 384/544 |
| 2002/0012484 A1 | | 1/2002 | Salou et al. | |

FOREIGN PATENT DOCUMENTS

DE 10202200 A1 * 8/2005
EP 1176409 1/2002

* cited by examiner

*Primary Examiner*—Pam Rodriguez
(74) *Attorney, Agent, or Firm*—Ostrolenk, Faber, Gerb & Soffen, LLP

(57) ABSTRACT

A wheel bearing having fixed part accommodating the brake caliper. The fixed part of the wheel bearing is connected to the wheel carrier by connecting elements. At least one projection is integrated with the fixed part, the wheel carrier or the connecting element. The projection transmits to the wheel carrier at least the torque acting in the fixed part during braking.

6 Claims, 3 Drawing Sheets

CONNECTION BETWEEN A WHEEL BEARING AND A WHEEL CARRIER

FIELD OF THE INVENTION

The invention relates to the connection between the wheel bearing and the wheel carrier on motor vehicles.

BACKGROUND OF THE INVENTION

Engineers have long been working on electronic vehicle control systems in order to improve the ride comfort and safety of motor vehicles. One link in these systems is the wheel bearing, at which the wheel speed is measured and the vertical wheel forces between the tire and the road are continuously determined. To enable the forces between the tire and the road to be determined more effectively, it has been found that the brake caliper must be fastened directly to the fixed part of the wheel bearing. EP 1176409 A1 discloses a wheel bearing with fastening openings to receive the brake caliper. The problem with this arrangement is that the entire braking torque has to be transmitted to the wheel bearing by tightly screwed bolts. For this purpose, the connecting elements, e.g. bolts, must be very strongly dimensioned to enable the unit to be preloaded in a suitably secure manner so as to prevent slippage between the wheel carrier and the wheel bearing, even under extreme loads.

OBJECT OF THE INVENTION

It is therefore the object of the invention to indicate a connection between the fixed flange of the wheel bearing and the wheel carrier that allows reliable and more accurate force transmission between the wheel bearing and the wheel carrier by simple measures while being easy to implement.

DESCRIPTION OF THE INVENTION

This object is achieved by the features of the invention.

The essence of the invention comprises introducing additional form-locking connections to transmit the torque from the stationary part of the wheel bearing to the wheel carrier in a specifically targeted manner during braking. These form-locking connecting elements free the bolts between the wheel bearing and the wheel carrier from the task of transmitting the torque, enabling the bolts to be made smaller. As a further advantage, the form-locking elements introduce the torque at a defined location in a specifically targeted manner, enabling this flow of forces to be taken into consideration in designing the wheel carrier. A specifically targeted flow of forces is necessary to satisfy the requirements for lightweight construction in the manufacture of motor vehicles. To avoid stress peaks in the material where necessary, it is also possible to provide a plurality of annular projections on the fixed flange component.

A further advantage of this form-locking connection is that all vertical wheel forces can be transferred in a form-locking manner to the wheel carrier.

A further advantage is achieved by setting the wall thickness of the annular projection so that it is a transition fit and it then expands due to the tightening process (forces applied in the thread flights of the projection) in such a way that the projection becomes an interference fit. This makes it much simpler to fit the wheel bearing in the wheel carrier since the transition fit allows the wheel bearing to be fitted without problems.

DETAILED DESCRIPTION OF THE INVENTION

Figure 1:
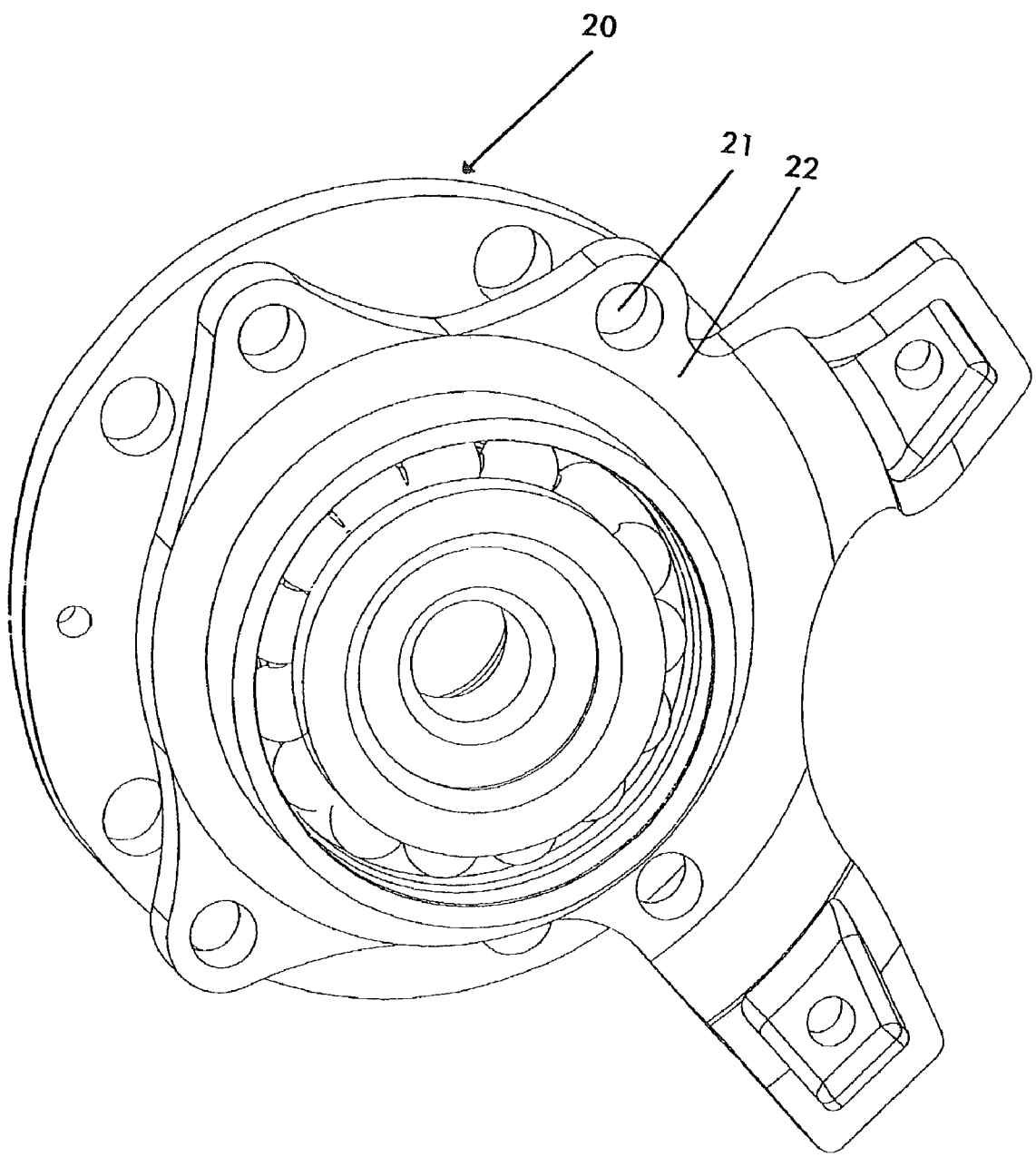
FIG. 1 shows a perspective view of a wheel bearing with possible ways of fastening the brake caliper from the prior art.

FIG. 1 shows a wheel bearing 20 with a fixed flange component 21, which has openings 22 to receive the brake caliper (not shown), in accordance with the prior art. In this arrangement, the entire braking torque must be transmitted nonpositively between the wheel bearing and the wheel carrier.

Figure 2:
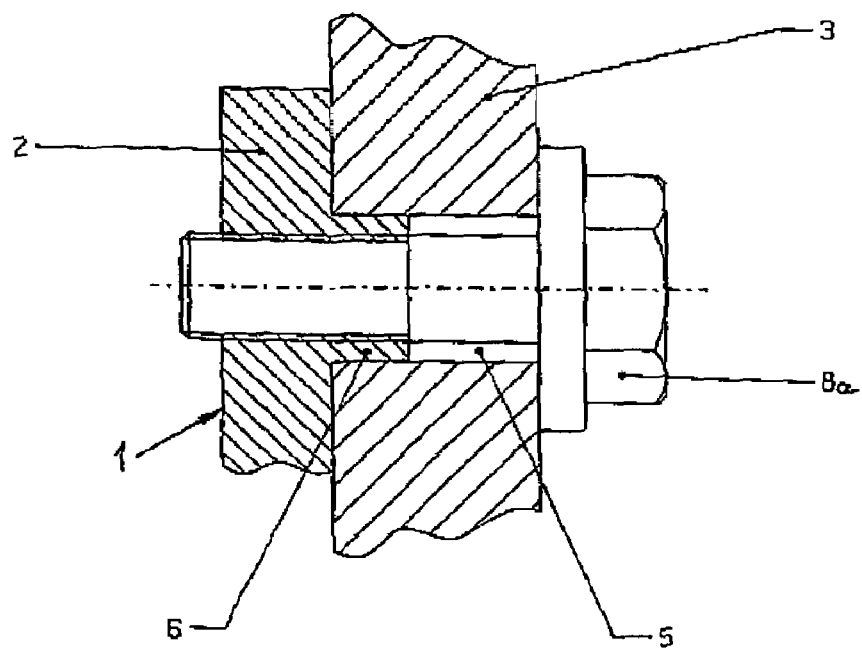
FIG. 2 shows a fragment of the wheel carrier and the fixed part of the flange in section.

FIG. 2 shows a fixed flange 2 of a wheel bearing 1. An annular projection 6 is formed integrally on the flange and projects in the direction of the wheel carrier 3. The annular projection 6 engages in a form-locking manner in a fastening opening 5 in the wheel carrier 3. The fixed flange is a component connected to the wheel carrier 3 by a bolt 8a. To introduce the braking torque into the wheel carrier in a defined manner, at least one form-locking connection is required between the wheel carrier 3 and the fixed flange 2.

Figure 3:
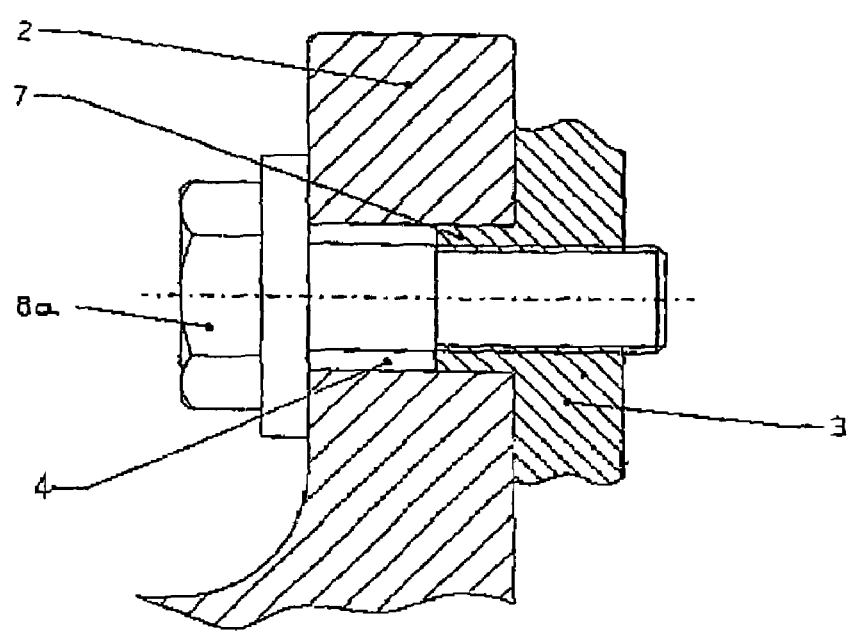
FIG. 3 shows a fragment of a variant of FIG. 2.

FIG. 3 shows the principle of FIG. 2. The annular projection 7 is here disposed on the wheel carrier 3 and projects in a form-locking manner into a fastening opening 4 in the fixed flange component 2. In this embodiment, the bolt 8a can be screwed in from the other side. In this embodiment too, at least one form-locking connection is provided between the fixed part of the wheel bearing and the wheel carrier.

Figure 4:
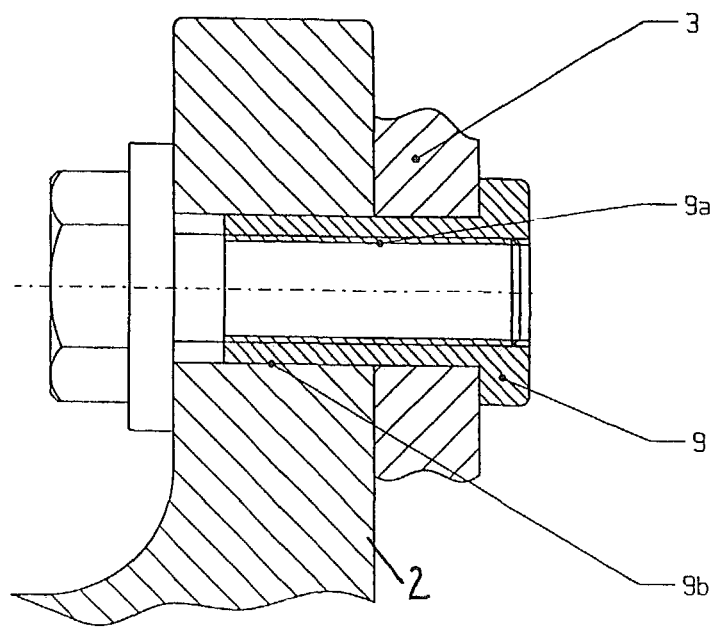
FIG. 4 shows a fragment of the fixed part of the flange bearing and the wheel carrier in section, using a threaded component with fitting surfaces.

FIG. 4 introduces an additional element 9 for the form-locking connection. This sleeve-type element 9 has a thread in the central hole 9a and a fitting surface on the outside diameter 9b. The advantage of this element is that the wheel carrier 3 can be manufactured from lighter material, e.g. aluminum, and the load-bearing points of the fastening can be made of a stronger material.

Figure 5:
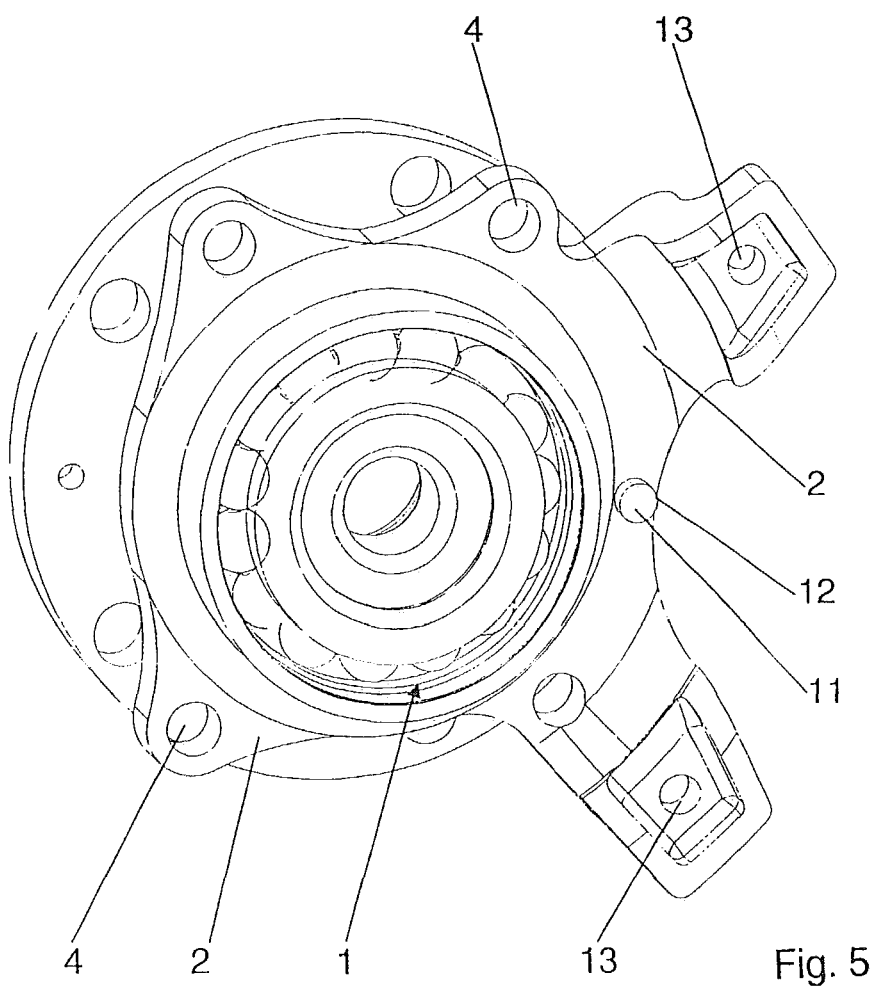
FIG. 5 shows a perspective view of a connection between the fixed flange component and the wheel carrier.

FIG. 5 shows a form-locking connection 11, 12 outside the fastening openings 4, i.e. away in the circumferential direction. This connection 11, 12 can be in the form of an additional component 11 (e.g. locating pin, stud, etc.). It is possible to make this form-locking connection as a one-piece projection 12 on the flange component 2. The equivalent solution in the form of a projection in the wheel carrier for cooperating with an opening in the fixed flange component is not shown. The brake caliper is held at the brake caliper receptacle 13.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A connection between a wheel bearing and a wheel carrier comprising:
   connecting elements only connecting the wheel carrier and a fixed part of the wheel bearing; and
   at least one projection, integrated with at least one of the fixed part of the wheel bearing, the wheel carrier and the connecting elements, transmitting to the wheel carrier a torque acting in the fixed part of the wheel bearing during braking;

the fixed part of the wheel bearing structured to couple to a brake caliper, wherein the projection comprises a bolt and a threaded section to receive the bolt, the projection being formed around at least one of the connecting elements, and wherein the wheel carrier has a receiving aperture therein and the projection is expandable by screwing the bolt into the threaded section of the projection so that the projection frictionally engages with the receiving aperture of the wheel carrier.

2. A connection between a wheel bearing and a wheel carrier comprising:

connecting elements only connecting the wheel carrier and a fixed part of the wheel bearing; and at least one projection, initially formed as a single integral portion of at least one of the fixed part of the wheel bearing, the wheel carrier and the connecting elements, transmitting to the wheel carrier a torque acting in the fixed part of the wheel bearing during braking, the at least one projection having a hole therethrough;

the fixed part of the wheel bearing structured to couple to a brake caliper.

3. The connection of claim 2, wherein the projection is formed around at least one of the connecting elements.

4. The connection of claim 3, wherein the projection comprises a bolt.

5. The connection of claim 4, wherein the projection includes a threaded section to receive the bolt.

6. The connection of claim 5, wherein the fixed part of the wheel bearing comprises a flange.

* * * * *